United States Patent [19]

Peters et al.

[11] Patent Number: 5,155,356
[45] Date of Patent: Oct. 13, 1992

[54] APPARATUS AND METHOD FOR DETECTING SUBTERRANEAN LEAKAGE FROM A LARGE STORAGE VESSEL

[75] Inventors: Lawrence E. Peters, Cary; Ali Regimand, Raleigh, both of N.C.

[73] Assignee: Troxler Electronic Laboratories, Inc., Research Triangle Park, N.C.

[21] Appl. No.: 800,050

[22] Filed: Nov. 29, 1991

[51] Int. Cl.⁵ .......................................... G01N 23/204
[52] U.S. Cl. ............................. 250/253; 250/390.04; 250/392; 73/49.2
[58] Field of Search .......... 250/253, 255, 301, 390.04, 250/390.05, 392; 73/49.2 R, 49.2 T

[56] References Cited

U.S. PATENT DOCUMENTS

| | | | |
|---|---|---|---|
| 3,428,806 | 2/1969 | Wack | 250/253 |
| 3,602,713 | 7/1970 | Kastner et al. | 250/392 |
| 3,889,112 | 6/1975 | Holmes et al. | 250/26 |
| 4,330,567 | 2/1984 | Oliver et al. | 250/270 |
| 4,404,516 | 9/1983 | Johnson, Jr. | 73/49.2 T |
| 4,587,423 | 5/1986 | Boyce | 250/269 |
| 4,645,926 | 2/1987 | Randall | 250/256 |
| 4,665,486 | 5/1987 | Schultz | 364/367 |
| 4,749,859 | 6/1988 | Schmidt | 250/270 |
| 4,754,136 | 6/1988 | Blakely | 250/301 |
| 4,896,528 | 1/1990 | Lewis | 73/49.2 T |
| 4,950,892 | 7/1990 | Olesen | 250/270 |
| 5,076,728 | 12/1991 | Golding | 73/40.7 |

Primary Examiner—Carolyn E. Fields
Attorney, Agent, or Firm—Bell, Seltzer, Park & Gibson

[57] ABSTRACT

An apparatus and method for detecting changes in a physical property of the material beneath a large storage vessel, such as a landfill. The apparatus includes one or more tubes defining elongate channels in the material beneath the storage vessel. A sensing probe is moved through the channel while taking and collecting measurements of the physical property of the material in the vicinity of the probe. Typically, moisture and/or density may be measured using conventional nuclear sources and associated detectors. The measurements are compared with reference data to thereby detect a change indicating a leak in the storage vessel.

42 Claims, 3 Drawing Sheets

APPARATUS AND METHOD FOR DETECTING SUBTERRANEAN LEAKAGE FROM A LARGE STORAGE VESSEL

FIELD OF THE INVENTION

The present invention relates to detecting subterranean leakage from a large storage vessel, such as a landfill. More particularly, the present invention is an apparatus and method for taking soil measurements from beneath a large storage vessel to detect leakage.

BACKGROUND OF THE INVENTION

With increased environmental awareness, it is frequently desirable to detect leakage from any large storage vessel, such as a landfill or leachate storage pond for a landfill. Leachate from a landfill, for example, represents the combination of liquid wastes, rainwater, and other undesirable liquids generated by the decay and separation of materials in the landfill. Landfill leachate may leak through a conventional clay liner of the landfill and contaminate groundwater supplies and eventually pollute drinking water supplies. If a leak in a liner is promptly detected, appropriate remedial action may be taken to repair the leak and greatly reduce, or eliminate, the amount of environmental damage resulting therefrom.

Existing landfills are often located very close to residential neighborhoods and new landfill space near major population centers is at a premium. Government regulations for landfills are strict and environmental groups are concerned for non-compliance by landfill operators.

Landfill designs have improved and newer landfills typically include a leachate collection system and a leachate pond. The leachate may then be collected from the landfill and thereby prevented from entering the soil and contaminating the groundwater. However, both the landfill and leachate pond typically cover relatively large geographic areas. Leaks, such as through a conventional clay liner, may occur at almost any point over the large area. Periodic groundwater sampling from the perimeter of the landfill, for example, may not provide early enough detection of a leak to limit the environmental damage caused thereby. Perimeter sampling will also fail to accurately pinpoint the exact location of the leak. Accordingly, what is needed is a reliable, accurate system for quickly detecting and determining the location of subterranean leaks in a large storage vessel, such as a landfill.

The prior art discloses various systems for detecting the moisture content of soil using vertical boreholes and various sensors. For example, U.S. Pat. No. 3,428,806 to Wack discloses an apparatus for determining soil humidity, or moisture content. The apparatus has a neutron source and a gamma ray source and respective detectors for each source. The sources are placed into the bottom of a vertical borehole while two sets of detectors are symmetrically positioned on the surface of the soil. The intensity of radiation detected by the two sets of detectors enables both the humidity per unit of volume of the sample, and its density per unit of volume, to be measured after appropriate calibration. Thus, the humidity per weight can then be determined for the soil sampled.

Radiological, or nuclear, vertical borehole logging is also disclosed, for example, in U.S. Pat. Nos. 3,889,112; 4,430,567 and 4,645,926. U.S. Pat. No. 4,430,567, for example, discloses a neutron generator for induced gamma ray logging wherein the generator is located in a probe which is lowered down into a vertical borehole for determining the porosity of the surrounding geological formation. The probe, as it is lowered or raised, is electrically connected to electronics at the surface of the vertical borehole. Several signals are thereby produced which may be suitably processed to ultimately arrive at a signal which is a direct indicator of geologic formation porosity. Further representative of nuclear vertical borehole logging is U.S. Pat. No. 4,665,486 to Schultz which discloses a downhole sonde, including a neutron generator and radiation detectors, which is lowered into the borehole while information is collected topside via an electrical logging cable.

U.S. Pat. No. 4,754,136 to Blakely discloses a system for detecting leakage from a buried tank containing a liquid organic material, such as gasoline. A series of vertical boreholes are provided around the perimeter of the tank. Measurements of the content of volatile organic material in the soil surrounding the series of vertical boreholes are taken by lowering a neutron backscatter gauge into the vertical boreholes.

Unfortunately, the vertical borehole logging systems of the prior art are not generally suitable for detecting moisture content in the soil beneath a relatively large storage vessel. An accurate determination of leaks from the interior area of the vessel can not be made by vertical borehole sampling around the perimeter of the storage vessel. A series of vertical boreholes drilled in the interior of the landfill are impractical and would create undesirable penetrations of the clay liner, perhaps causing an additional leakage problem. An impractically large number of vertical boreholes may be required to adequately monitor a large area, such as that covered by a typical landfill.

SUMMARY OF THE INVENTION

With the foregoing background in mind, it is an object of the present invention to provide a practical system for detecting subterranean leakage from a relatively large storage vessel, such as a landfill or a landfill leachate pond.

It is another object of the present invention to provide a system for detecting subterranean leakage which is accurate in determining where a leak has occurred to pinpoint the area of a leak so that repairs may be easily and promptly effected.

In accordance with the present invention, the system for detecting subterranean leakage from a large storage vessel, such as a landfill or landfill leachate pond, includes one or more elongate channels extending beneath the large storage vessel and across at least one dimension thereof and a sensing probe which is moved through the channel or channels while taking measurements of a physical property, such as moisture content and/or density, of the material in the vicinity of the probe. By taking measurements at periodic intervals and comparing the measured material properties with measurements taken previously, changes in the material moisture content and/or density, such as may occur due to a leak can be readily detected, and the location of the areas where the changes occurred can be identified.

The elongate channel may be provided by a plastic tube or conduit, for example. Opposite ends of the channel are open and accessible from locations typically adjacent the perimeter of the storage vessel. In lieu of a single channel, a plurality of plastic conduits may also be positioned in a two-dimensional grid pattern beneath the storage vessel to more readily and accurately determine the location of a leak.

The sensing probe is positioned within the elongate channel and means are provided for moving the probe through the elongate channel from one end to the other beneath the storage vessel. The probe includes means for taking measurements of a physical property of the material in the vicinity of the probe as the probe is moved through the channel. In one embodiment, the probe is self-contained and includes data collection means for storing the thus obtained material property measurements as the probe moves through the channel. A cable and a winch may provide the means for moving the self-contained sensing probe through the elongate channel.

The measurements of the material may be taken at intervals as the probe is moved through the channel so that the stored material property measurements indicate a profile of the material property at different locations along the extent of travel of the probe. Also, a series of spaced apart reference markers may be positioned along the channel to assist in correlating the material property measurement data to a physical location beneath the storage vessel. For example, a series of spaced apart concrete reference markers may be provided surrounding the channel at spaced intervals. The concrete reference markers provide a readily detectable change in a material property, such as density or moisture content, as the probe passes through the channel in the vicinity of the reference marker.

The probe preferably contains a moisture sensor for sensing the moisture content of the material in the vicinity of the probe. The probe may also include means for measuring the material density. Material moisture and density may be measured using radioisotope sources, such as measuring thermalized neutrons and backscattered gamma radiation respectively. The moisture sensor preferably includes a source of fast neutrons, a detector of thermalized neutrons, and a means for obtaining a count of thermalized neutrons and for determining therefrom the moisture content of material in the vicinity of the probe. The means for obtaining a count of thermalized neutrons and other control functions of the probe may be provided by a microprocessor operating under stored program control, as would be readily understood by those skilled in the art.

In the embodiment in which the probe is self-contained, the data stored in the probe is retrieved by data retrieval means which includes an external processor which may be positioned adjacent an end of the channel. The external processor includes means cooperating with the probe upon its emerging from the end of the channel to retrieve the data from the probe. Data analysis means cooperates with the data retrieval means for comparing the retrieved material property measurements with reference data to thereby detect a change in the material property measurements which indicate a leak. The data analysis means preferably includes means for identifying the particular location along the extent of travel of the probe where a change in the material property occurred, such as by detecting changes in moisture and/or density with respect to the position of reference markers positioned along the channel.

As would be readily understood by those skilled in the art, other means may be used to correlate the measurement data with the physical location beneath the storage vessel from which the measurement data was taken. For example, the measurements may be taken at predetermined time intervals from the beginning of the channel as the probe is being moved at constant speed through the channel and the distance can be derived from these measurements. Alternately, the cable may include length markings to correlate the measurements with the location of the probe through the channel and the distance can be derived from these measurements. Thus, the changes in measurement data may be used to accurately detect where a subterranean leak in the storage vessel has occurred.

The system preferably includes a docking station located at one or both of the ends of the channel for receiving the probe when it emerges from the end of the channel. The docking station preferably includes a protective radiation shielding enclosure for receiving the probe and for shielding the radiation sources when the probe is received in the docking station. The external processor may be connected to the probe by an interconnecting cable or other remote means so that measurement data may be retrieved from the probe when the probe is received in the docking station. The self-contained sensing probe may additionally include means for receiving and storing programming instructions governing the operation thereof input from the external processor. Such instructions may include, for example, commands for a time interval for collecting measurement data.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein. Applicant provides this embodiment so that this disclosure will be thorough and complete, and will fully convey the scope of the invention to those skilled in the art. Like reference numbers refer to like elements throughout.

Figure 1:
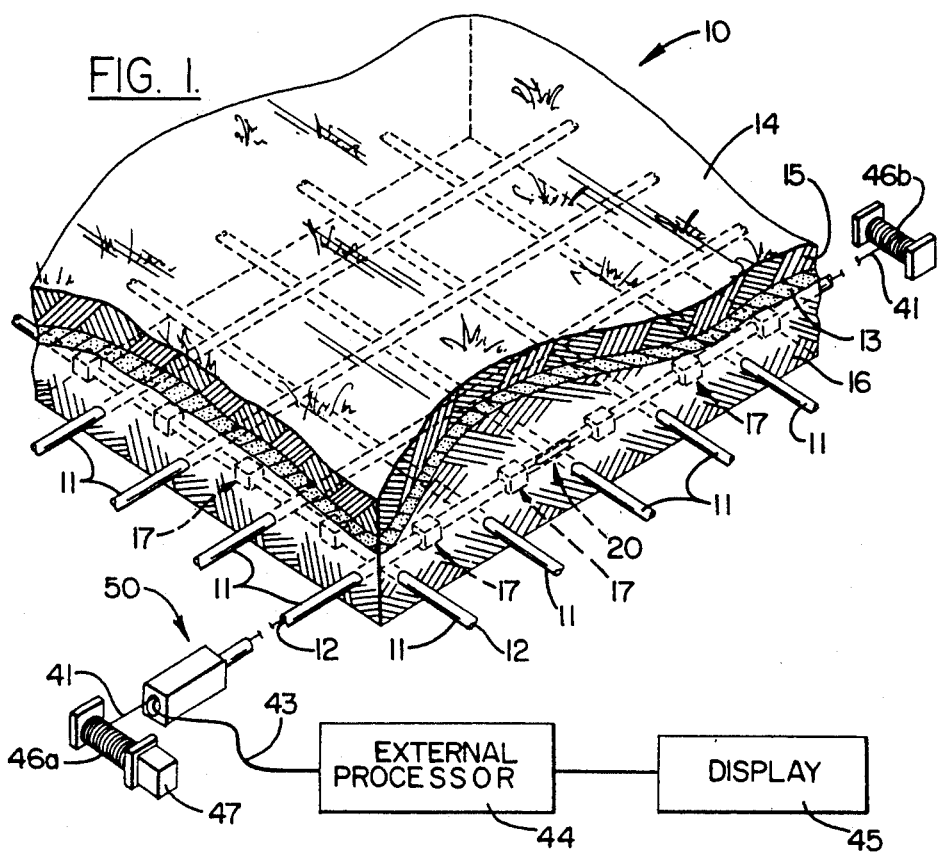
FIG. 1 is a schematic perspective view of a landfill including a leakage detection system of the present invention.

Referring to FIG. 1 there is shown a system for detecting subterranean leakage from a large storage vessel according to the present invention, the system being generally designated by reference numeral 10. In the illustrated embodiment, the leak detection system 10 includes a plurality of tubes 11 arranged in a two-dimensional grid pattern. Each tube 11 defines an elongate channel 12 extending beneath the clay liner 13 of a landfill 14. The clay liner 13 prevents leakage of leachate from the trash 15 to the material 16 beneath the landfill 14. As would be readily understood by those skilled in the art, the leak detecting system 10 may be used in conjunction with any large storage vessel for detecting subterranean leaks therefrom.

Each tube 11 has open opposite ends that are accessible preferably from the perimeter of the landfill 14. The tubes 11 may preferably be nonperforated polyethylene and have a diameter of about 4 inches. As would be readily understood by those skilled in the art, for some applications and depending on the configuration of the storage vessel, a single tube 11 extending in a single dimension may be used. Means other than a tube 11 may be used to define one or more channels extending beneath the landfill 14.

Figure 2:
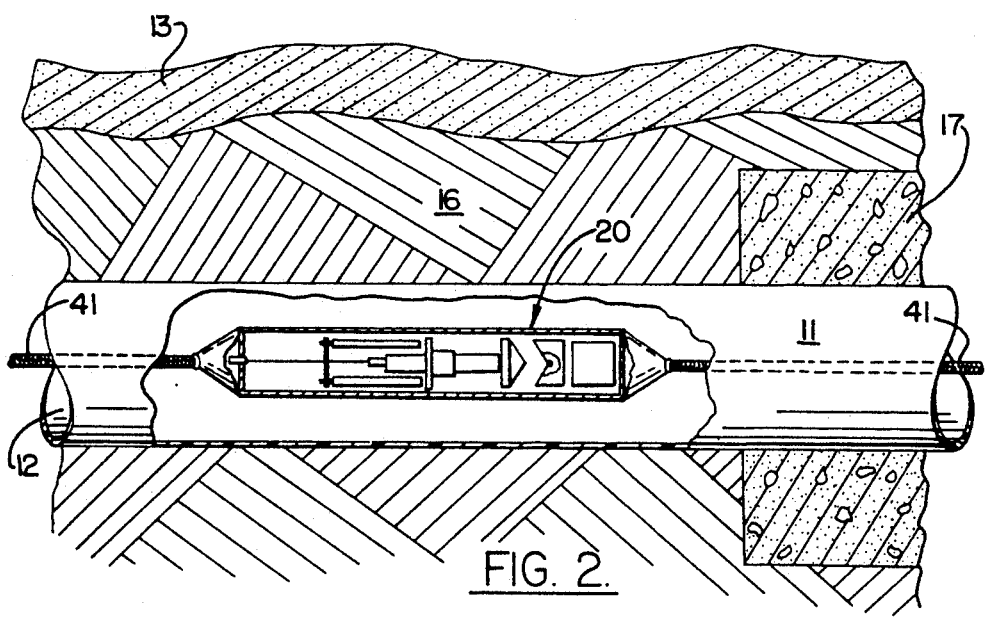
FIG. 2 is a greatly enlarged fragmentary schematic view of the self-contained sensing probe within the elongate channel as shown in FIG. 1.

The leak detection system 10 includes a sensing probe 20 movable within the elongate channel 12 as shown in FIG. 2. The sensing probe 20 includes means for taking measurements of a physical property of the material 16 in the vicinity of the probe 2D. In the embodiment illustrated, the probe 20 is self-contained and also includes data collection means for storing the thus collected data.

Figure 3:
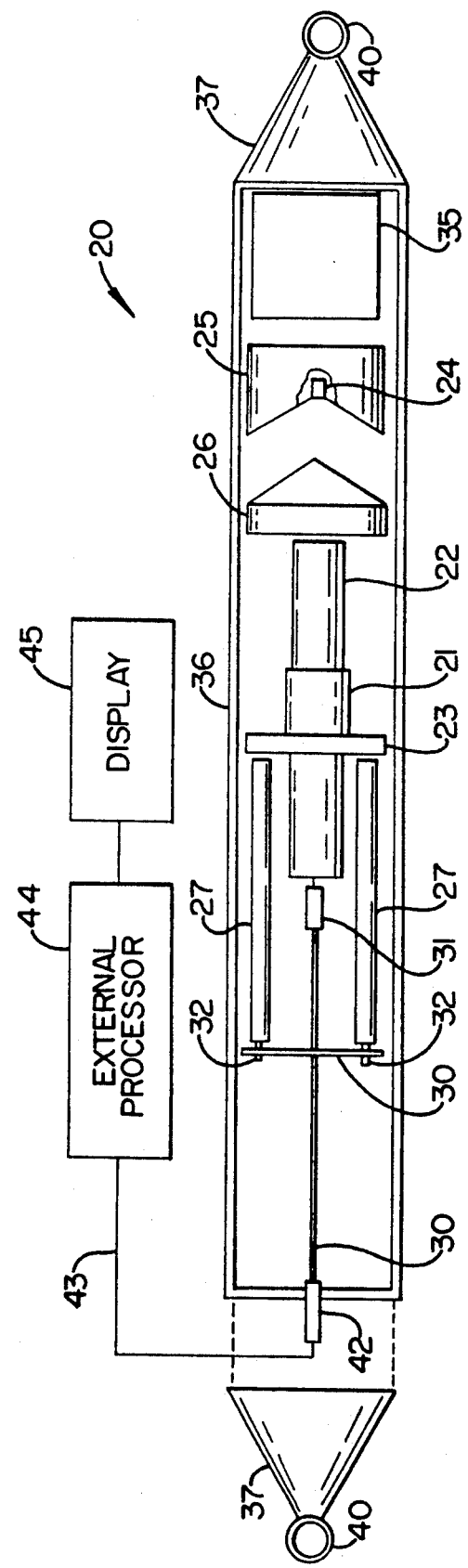
FIG. 3 is schematic perspective view of the self-contained sensing probe positioned within a docking station according to the present invention.

As shown in FIG. 3, the means for taking measurements of a physical property of the material may include a material moisture sensor and/or a material density sensor. In the illustrated embodiment, the moisture sensor comprises a thermal neutron gauge which includes a source 21 of fast neutrons, such as a mixture of Americium-241 and Beryllium, and an associated thermalized neutron detector, such as one or more He-3 tubes 22, for detecting counts of thermalized neutrons from the material. A neutron radiation shield 23 is positioned adjacent the neutron source 21. As is known by those skilled in the art, a thermal neutron gauge detects thermal neutrons which have been moderated by neutron moderating elements, such as hydrogen, present in a test material. Using procedures known in art, the gauge can be utilized to measure material moisture content.

The density sensor or gauge, as shown in the illustrated embodiment, includes a conventional source 24 of gamma radiation, such as Cesium-137, partially surrounded by a shield 25 having an opening therein positioned opposite a gamma radiation detector 26. The detector of gamma radiation is preferably one or more Geiger-Muller tubes 27. Material density measurements are obtained utilizing primarily the principle of Compton scattering of gamma rays, as is conventional.

Both the density sensor and the moisture sensor are housed in close proximity to one another in a compact arrangement within the probe housing. By this arrangement, the probe simultaneous measures both moisture and density of the same volume of soil in the surrounding vicinity of the probe.

Each sensor may be controlled by a microprocessor mounted on a printed circuit board 30 within the probe. The microprocessor operates under stored program instructions and includes associated internal memory or external memory. The means for collecting and storing the measurement data are also preferably the microprocessor operating under stored program control. Attached to an end of the circuit board 30 is a helium tube connector 31 and an anode connector 32 for the Geiger Mueller tubes 27.

The probe 20 also includes a self-contained power supply 35, such as a rechargeable battery, and a protective generally cylindrical housing 36 having a conical end cap 37 positioned on opposing ends. Each end cap 37 includes a pull ring 40 for attachment to a pulling cable 41 (FIG. 2) so that the probe 20 may be moved through the channel 12. A conventional data connector 42 is provided beneath one of the end caps 37. The data connector 42 allows connection to a suitable interconnecting cable 43, to connect the microprocessor to an external processor 44 and to an external power source for recharging the power supply 35.

The external processor 44 preferably comprises a microprocessor operating under stored program control. The external processor 44 may also include a conventional CRT display 45 or other means for conveying information to an operating technician.

When the probe emerges from one end of the channel, it may be connected to the external processor 44 via the cable 43. The cable and the external processor 44 may thus function as a data retrieval means. Data from material property measurements taken by the probe can be uploaded to the external processor 44 where the data can be further processed, analyzed and compared to previous measurements to detect any changes in material property measurements indicative of a leak in the storage vessel and to identify the sites of any such leaks. The cable 43 and external processor 44 may also be utilized to download program instructions to the self contained probe, whereby the mode of operation of the probe can be altered or updated. The downloaded program instructions can, for example, specify when to turn the probe on and off, the types of measurements to be taken, the frequency of the measurements, the lengths of the counts, or can provide calibration data.

Unlike prior art vertical well-logging probe devices which required continuous control from surface electronics and an interconnecting signal transmitting cable, the present invention has a self-contained probe 20 that takes and collects data for later retrieval by the external processor 44. Thus, the self-contained probe 20 according to the present invention need only be moved through the elongate channel 12 by suitable means, such as a cable 41, cable reels 46a, 46b, and a movable winch 47, as shown in FIG. 1. A single probe 20 and a single external processor 44 may be moved from one channel 12 to the next until measurement data for all of the channels 12 has been collected.

As the probe 20 is moved through the channel 12, material property measurements are taken at intervals. Thus, the material property measurements indicate a profile of the material property underneath the landfill 14. The external processor 44 may retrieve the material property data and compare it to reference data, such as from a prior set of measurements, to thereby detect whether a change has occurred. A significant change may be indicative that a leak has occurred in the clay liner 13 of the landfill 14.

Reference markers 17 may be provided to pinpoint the physical location correlating to the location from which the leak has been detected. In the illustrated embodiment, a series of spaced apart concrete reference markers 17 surround the tubes 12. The concrete markers 17 produce a readily detectable abrupt change in a density measurement, for example, when the probe 20 passes therethrough. The concrete markers 17 may also indicate a similar abrupt change in the material moisture measurement.

While concrete markers 17 provide one means for correlating or identifying the location of the measurement, other means may also be provided as would be understood by those skilled in the art. For example, the probe 20 may include means for taking the measurements at predetermined time intervals and the probe 20 may be uniformly moved through the channel 12. Then, the time of the measurement may be correlated to the distance travelled through the channel 12 to identify the location of the measurement in the material 16 under the clay liner 13.

Figure 4:
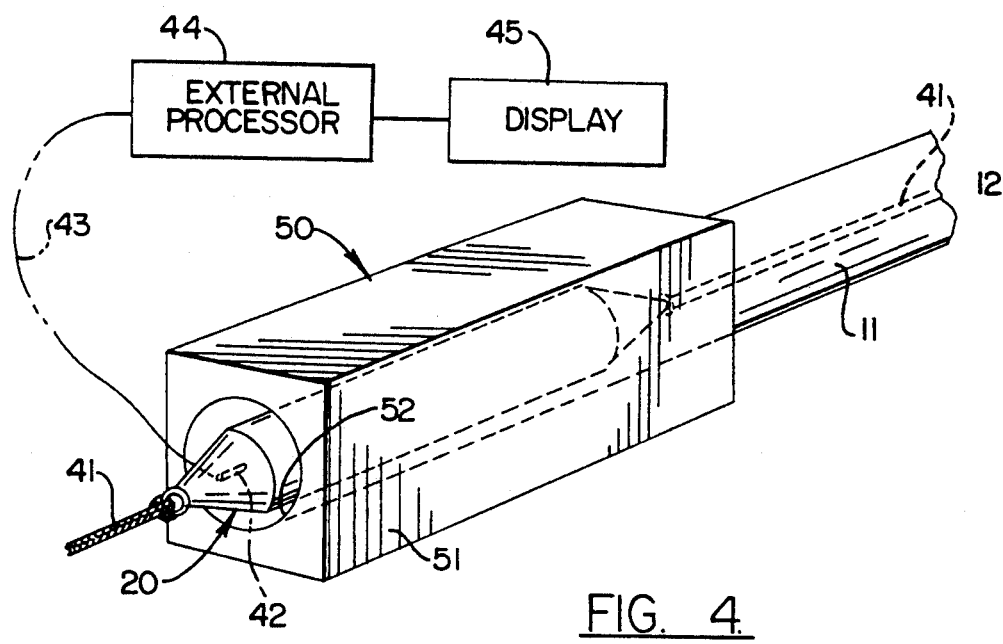
FIG. 4 is a schematic block diagram of the self-contained sensing probe and external processor according to the present invention.

As best shown in FIG. 4, the self-contained probe 20 may be moved through the channel 12 to a docking station 50 positioned at one or both ends of the channel 12. The docking station 50 comprises a radiation shielding enclosure 51 with an opening 52 therein to receive the self-contained probe 20. The docking station 50 provides a convenient location for receiving the probe 20 in order to retrieve the material property measurements data therefrom. When received in the docking station 50, the probe 20 may be connected to the external processor 44 by a conventional data communications cable 43 attached to the connector 42 of the probe 20 (FIG. 3).

The leak detection system 10 of the present invention thus provides a practical system for accurately detecting and pinpointing the location of subterranean leaks in a large storage vessel, such as a landfill. Many modifications and other embodiments of the invention will come to the mind of one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. A system for detecting subterranean leakage from a large storage vessel or area, said system comprising:
    means defining at least one elongate channel extending in the material beneath the storage vessel or area and across at least one dimension thereof, opposite ends of said at least one elongate channel being open and accessible from the surface of the ground;
    a sensing probe movable within said at least one elongate channel, said probe including means for taking measurements of a physical property of the material in the vicinity of said probe;
    means for moving said probe through said at least one elongate channel from one end to the other beneath the storage vessel or area while said probe is operative for taking material property measurements; and
    means for processing the material property measurements obtained by said probe to determine the existence of subterranean leakage.

2. The system according to claim 1 wherein said means for processing the material property measurements comprises data analysis means for receiving the material property measurements and for comparing the same with reference data to detect changes in the material property.

3. The system according to claim 2 wherein said means for taking measurements of a physical property of the material includes means for taking the measurements at intervals as said probe is moved through said at least one channel so that the material property measurements indicate a profile of the material property at successive locations along the extent of travel of said at least one probe; and wherein said data analysis means includes means for identifying the particular location along the extent of travel of the probe where a change in the material property occurred.

4. The system according to claim 1 wherein said means for taking measurements of a physical property of the material includes means for taking the measurements at intervals as said probe is moved through said at least one channel so that the stored material property measurements indicate a profile of the material property at successive locations along the extent of travel of the probe through said at least one channel.

5. The system according to claim 4 further comprising a series of spaced apart reference markers positioned along said at least one channel for causing a series of readily detectable changes in the material property as the probe passes in the vicinity thereof so that material property measurements may be readily correlated with the known locations of said reference markers.

6. The system according to claim 1 wherein said means for taking measurements of a physical property of the material comprises a moisture sensor for sensing the moisture content of the material in the vicinity of said probe.

7. The system according to claim 6 wherein said means for taking measurements of a physical property of the material additionally comprises a material density sensor for measuring the density of the material in the vicinity of said probe.

8. The system according to claim 1 wherein said means for moving said sensinq probe through said at least one channel comprises a cable extending longitudinally through the at least one elongate channel and attached to said probe and a winch cooperating with said cable for pulling said probe through said at least one channel.

9. The system according to claim 1 wherein said sensing probe is self-contained and includes data collection means for storing the material property measurements, and wherein said means for processing the material property measurements obtained by said probe to determine the existence of subterranean leakage includes data retrieval means adapted to cooperate with said probe upon its emergence from at least one end of said at least one channel for retrieving the stored material property measurements from said probe.

10. The system according to claim 9 further comprising a docking station located on at least one of the ends of said at least one channel for receiving said probe when it emerges from at least one end of said at least one channel, and wherein said data retrieval means includes an electrical connector adapted to receive data from said probe, and said probe includes a cooperating electrical connector adapted to mate with said connector of said data retrieval means when the probe is received in said docking station.

11. The system according to claim 10 wherein said data retrieval means includes an external processor including means for processing the material property measurements retrieved from said probe.

12. The system according to claim 11 wherein said self-contained sensing probe additionally includes means for receiving and storing programming instructions governing the operation of the self-contained probe, and wherein said external processor of said data retrieval means includes means for loading programming instructions into the probe.

13. A system for detecting subterranean leakage from a large storage vessel or area, said system comprising:

means defining at least one elongate channel extending in the material beneath the storage vessel or area and across at least one dimension thereof, opposite ends of said at least one channel being open and accessible from the surface of the ground;

a self-contained moisture sensing probe movable within said at least one elongate channel, said probe comprising a source of fast neutrons, a detector of thermalized neutrons, means cooperating with said thermalized neutron detector for obtaining counts of thermalized neutrons as the probe is moved through the at least one channel, and data collection means for storing the thus obtained counts of thermalized neutrons;

means for moving said probe through the at least one elongate channel from one end to the other beneath the storage vessel or area while said probe is operative for taking and storing counts of thermalized neutrons; and data retrieval means adapted to cooperate with said probe upon its emergence from at least one end of said at least one channel for retrieving the stored counts of thermalized neutrons in said data collection means.

14. The system according to claim 13 further comprising a docking station located on at least one of the ends of the at least one channel for receiving said probe upon emergence of said probe from at least one end of said at least one channel; and wherein said data retrieval means includes means cooperating with said data collection means of said probe for retrieving the counts of thermalized neutrons therefrom when said probe is received in said docking station.

15. The system according to claim 14 wherein said docking station includes a protective radiation shielding enclosure for receiving said probe and for shielding said neutron source when said probe is received in said docking station.

16. The system according to claim 13 further comprising data analysis means cooperating with said data retrieval means for comparing the retrieved counts of thermalized neutrons with reference data and for detecting changes in the material moisture.

17. The system according to claim 16 further comprising means cooperating with said data analysis means for identifying the particular location along the extent of travel of the probe where a change in the material moisture occurred.

18. The system according to claim 13 wherein said probe further comprises a gamma source and detector of gamma radiation backscattered by the material for measuring the material density in the vicinity of said probe.

19. The system according to claim 18 further comprising a series spaced apart reference markers positioned along said at least one elongate channel for causing a series of readily detectable changes in at least one of the material moisture and material density measurements as said probe passes in the vicinity thereof so that material property measurements may be readily correlated with the known locations of said reference markers.

20. In combination with a landfill having a liner, an apparatus for detecting leakage of leachate through the liner and comprising:

means defining a plurality of elongate channels extending in the material beneath the liner and across at least one dimension thereof, opposite ends of each elongate channel being open and accessible from the ground;

a sensing probe movable within an elongate channel, said probe including means for taking measurements of a physical property of the material in the vicinity of the probe indicative of a leak in the liner;

means for moving said probe through said elongate channel from one end to the other beneath the liner while said probe is operative for taking material property measurements; and means for processing the material property measurements obtained by said probe to determine the existence of subterranean leakage.

21. The system according to claim 20 wherein said means for processing the material property measurements comprises data analysis means for receiving the material property measurements and for comparing the same with reference data to detect changes in the material property.

22. The system according to claim 21 wherein said means for taking measurements of a physical property of the material includes means for taking the measurements at intervals as said probe is moved through said channel so that the material property measurements indicate a profile of the material property at successive locations along the extent of travel of said probe; and wherein said data analysis means includes means for identifying the particular location along the extent of travel of the probe where a change in the material property occurred.

23. The system according to claim 20 wherein said probe further comprises a gamma source and detector of gamma radiation backscattered by the material for measuring the material density in the vicinity of said probe.

24. The system according to claim 23 further comprising a series of spaced apart reference markers positioned along said elongate channel for causing a series of readily detectable changes in at least one of the material moisture and material density measurements as said probe passes in the vicinity thereof so that material property measurements may be readily correlated with the known locations of said reference markers.

25. The system according to claim 20 wherein said means for taking measurements of a physical property of the material includes means for taking the measurements at intervals as the probe is moved through the channel so that the stored material property measurements indicate a profile of the material property at successive locations along the extent of travel of the probe; and wherein said data analysis means includes means for identifying the particular location along the extent of travel of said probe where a change in the material property occurred.

26. A method for detecting subterranean leakage from a large storage vessel or area, said method comprising the steps of:

forming at least one elongate channel extending in the material beneath the storage vessel or area and across at least one dimension thereof, the opposite ends of the at least one channel being open and accessible from the ground;

moving a probe through the at least one elongate channel while taking measurements of a physical property of the material in the vicinity of the probe; and processing the material property measurements obtained by said probe to determine the existence of subterranean leakage.

27. The method according to claim 26 wherein said step of processing the material property measurements comprises comparing the material property measurements to reference data to detect a change in the material property indicative of a leak.

28. The method according to claim 26 further comprising the steps of:
providing a series of spaced apart reference markers along the at least one channel; and
correlating the material property measurements to the known locations of the reference markers to accurately determine the location of a leak.

29. The method according to claim 26 wherein the step of taking material property measurements comprises the step of taking material moisture measurements.

30. The method according to claim 29 wherein in the step of taking material moisture measurements comprises taking counts of thermalized neutrons from the material.

31. The method according to claim 26 wherein the step of taking material property measurements comprises the step of taking material density measurements.

32. The method according to claim 26 wherein said step of moving the sensing probe through the at least one elongate channel while taking measurements of a physical property of the material in the vicinity of the probe also includes storing the thus obtained measurements in a data storage provided within the probe; and wherein said step of processing the material property measurements obtained by said probe to determine the existence of subterranean leakage includes the steps of retrieving the stored data from the probe upon its emergence from at least one end of said at least one channel.

33. The method according to claim 32 wherein the self-contained sensing probe includes a nuclear radiation source, and wherein the step of moving the probe to the end of the channel comprises the step of receiving the probe in a protective radiation shielded docking station adjacent the end of the at least one channel.

34. The method according to claim 33 further comprising the step of loading programming instructions into the probe while the probe is received in the docking station.

35. A method for detecting subterranean leakage from a large storage vessel or area, said method comprising the steps of:
forming at least one elongate channel extending in the material beneath the storage vessel or area and across at least one dimension thereof, the opposite ends of the at least one channel being open and accessible from the ground;
moving a self-contained moisture sensing probe through the at least one elongate channel while taking moisture measurements of the material in the vicinity of the probe and while storing the thus obtained material moisture measurements in the self-contained probe; and
retrieving the stored material property measurements from the probe while the probe is received in a docking station at an end of the at least one channel.

36. The method according to claim 35 further comprising the step of comparing the retrieved material moisture measurements to reference data to detect a leak.

37. The method according to claim 35 further comprising the steps of:
providing a series of spaced apart reference markers along the at least one channel; and
correlating the retrieved material moisture measurements to the known locations of the reference markers to accurately determined the location of a leak.

38. The method according to claim 35 wherein in the step of taking material moisture measurements comprises taking counts of thermalized neutrons from the material.

39. The method according to claim 35 further comprising the step of taking material density measurements.

40. The method according to claim 35 wherein the self-contained sensing probe includes a nuclear radiation source, and wherein the step of moving the probe to the end of the at least one channel comprises the step of receiving the probe in a protective radiation shielded docking station adjacent the end of the at least one channel.

41. The method according to claim 35 further comprising the step of loading programming instructions into the probe while the probe is received in the docking station.

42. A method for detecting subterranean leakage from a large storage vessel or area, said method comprising the steps of:
forming a plurality of elongate channels extending in the material beneath the storage vessel or area and across at least one dimension thereof, opposite ends of each elongate channel being open and accessible from the ground;
moving a moisture sensing probe through each of said elongate channels while taking moisture measurements of the material in the vicinity of the probe; and
processing the material property measurements obtained by said probe to determine the existence and location of subterranean leakage.

* * * * *